United States Patent
Crawford et al.

(10) Patent No.: US 10,093,587 B2
(45) Date of Patent: Oct. 9, 2018

(54) PROCESSES FOR THE MANUFACTURE OF LIGHTWEIGHT CERAMIC MATERIALS AND ARTICLES PRODUCED THEREBY

(71) Applicants: Robin Crawford, Carlisle (CA); John Douglas, Brantford (CA)

(72) Inventors: Robin Crawford, Carlisle (CA); John Douglas, Brantford (CA)

( * ) Notice: Subject to any disclaimer, the term of this patent is extended or adjusted under 35 U.S.C. 154(b) by 0 days.

(21) Appl. No.: 14/308,647

(22) Filed: Jun. 18, 2014

(65) Prior Publication Data
US 2014/0371050 A1  Dec. 18, 2014

Related U.S. Application Data

(60) Provisional application No. 61/836,421, filed on Jun. 18, 2013.

(51) Int. Cl.
| | |
|---|---|
| *C04B 38/06* | (2006.01) |
| *C04B 38/10* | (2006.01) |
| *B28B 1/24* | (2006.01) |
| *C04B 35/64* | (2006.01) |
| *B28B 1/50* | (2006.01) |
| *B28B 3/20* | (2006.01) |
| *C04B 35/622* | (2006.01) |
| *C04B 38/02* | (2006.01) |
| *C04B 111/00* | (2006.01) |

(52) U.S. Cl.
CPC ............ *C04B 38/10* (2013.01); *B28B 1/24* (2013.01); *B28B 1/50* (2013.01); *B28B 3/20* (2013.01); *C04B 35/62213* (2013.01); *C04B 35/64* (2013.01); *C04B 38/02* (2013.01); *C04B 38/064* (2013.01); *C04B 2111/00129* (2013.01); *C04B 2235/6021* (2013.01); *C04B 2235/6022* (2013.01); *C04B 2235/612* (2013.01)

(58) Field of Classification Search
CPC ....... C04B 38/02; C04B 38/10; C04B 38/103; C04B 38/106; C04B 38/06; C04B 38/0625; C04B 38/0675
USPC ...................... 264/42–44, 630–631
See application file for complete search history.

(56) References Cited

U.S. PATENT DOCUMENTS

| | | | | |
|---|---|---|---|---|
| 4,559,367 A * | 12/1985 | Hurps | ................... | C08J 9/0061 264/45.3 |
| 5,976,454 A * | 11/1999 | Sterzel | ................... | B01J 35/04 264/43 |
| 6,733,722 B2 * | 5/2004 | Singer | ................... | B22F 3/1125 419/2 |
| 2001/0048176 A1* | 12/2001 | Franke | ................ | B29C 47/0004 264/143 |
| 2006/0205831 A1* | 9/2006 | Reedy | ................ | C08G 18/0885 521/131 |
| 2008/0307760 A1* | 12/2008 | Chatlani | .............. | B01D 46/244 55/523 |

(Continued)

*Primary Examiner* — Erin Snelting
(74) *Attorney, Agent, or Firm* — Stuart Wilkinson

(57) ABSTRACT

In a process for manufacturing foamed material an expansion agent, a ceramic base material and water are blended together. The blend is heated and pressurized to homogenize and liquefy or plasticize it. The blend is then extruded through a die where, in the course of the extrusion, superheated water in the blend vaporizes to foam the blend. To make articles of manufacture, extrudate is cut to length, machined and fired, or is injection molded while still malleable and then fired.

11 Claims, 1 Drawing Sheet

(56) References Cited

U.S. PATENT DOCUMENTS

| | | | | |
|---|---|---|---|---|
| 2008/0318759 | A1* | 12/2008 | Richet | C04B 38/067 501/80 |
| 2010/0038308 | A1* | 2/2010 | Brundage | B01D 39/2075 210/510.1 |
| 2010/0272983 | A1* | 10/2010 | Thouilleux | C04B 24/10 428/318.4 |
| 2010/0283169 | A1* | 11/2010 | Emmons | C04B 35/04 264/43 |
| 2011/0171099 | A1* | 7/2011 | Augier | B01D 39/2075 423/345 |
| 2011/0306691 | A1* | 12/2011 | Sosa | B29C 44/08 521/79 |
| 2013/0062275 | A1* | 3/2013 | Kobashi | B01D 39/2093 210/483 |
| 2014/0295132 | A1* | 10/2014 | Okazaki | C04B 41/89 428/116 |

* cited by examiner

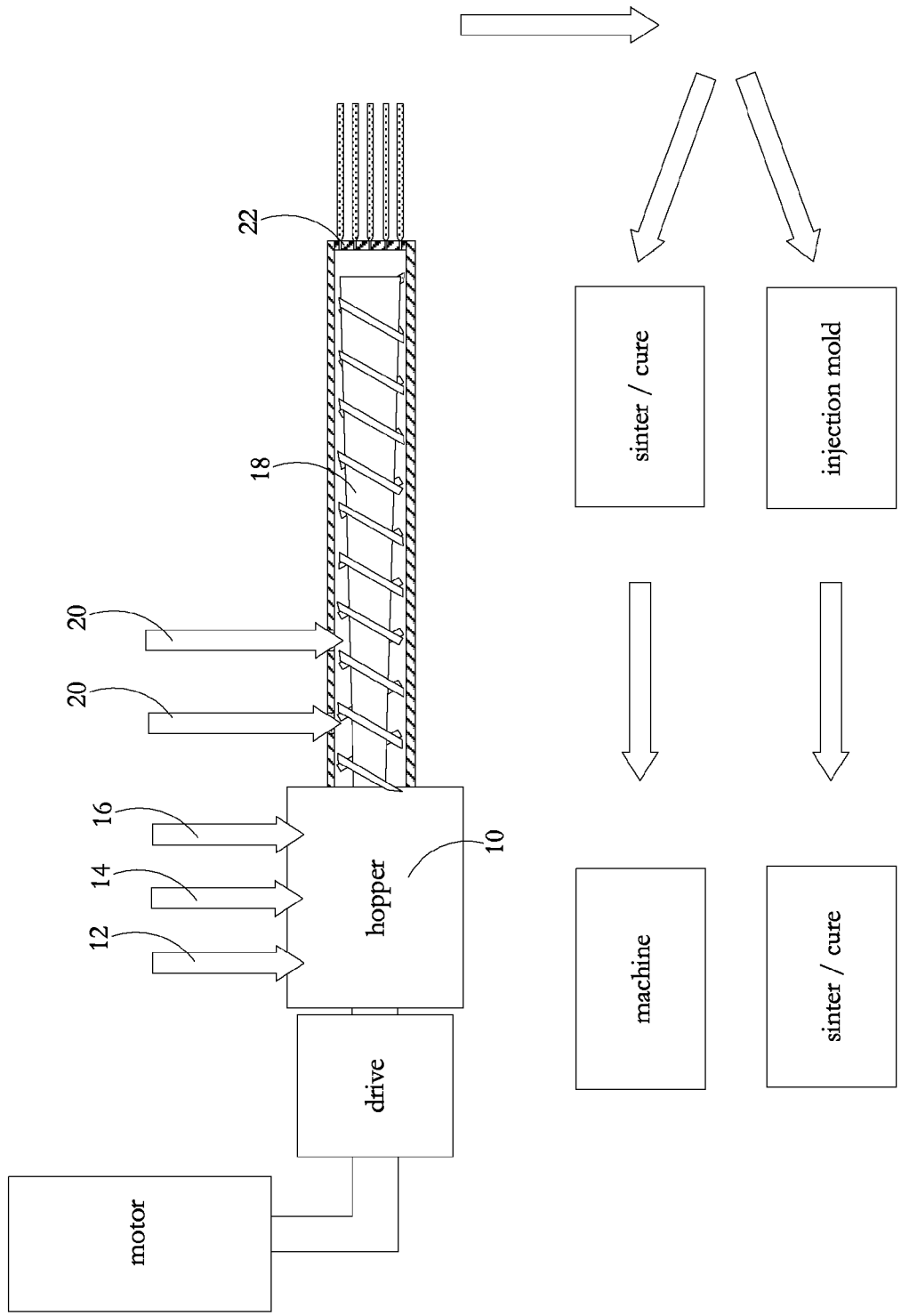

PROCESSES FOR THE MANUFACTURE OF LIGHTWEIGHT CERAMIC MATERIALS AND ARTICLES PRODUCED THEREBY

CROSS REFERENCE TO RELATED PATENTS

The present application claims priority pursuant to 35 U.S.C. § 119(e) to pending U.S. Provisional Application Ser. No. 61/692732 entitled "PROCESSES FOR THE MANUFACTURE OF LIGHT-WEIGHT CERAMIC MATERIALS AND ARTICLES PRODUCED THEREBY" filed Jun. 18, 2013, the disclosure of which application is hereby incorporated herein by reference in its entirety and made part of the present application for all purposes.

FIELD OF THE INVENTION

This invention relates to processes for the manufacture of light-weight ceramic materials.

BACKGROUND

Ceramic materials and light-weight materials are typically not synonymous with one another. Light-weight implies a low density and high porosity. Lighter weight ceramics are made from a few different techniques that include: the use of burnout materials, reticulated foam, vacuum casting, and expanding clay.

Burnout materials are typically organic-based materials added to clay batch recipes that burn out upon firing to form porous ceramic. The burnout material is a solid particle that occupies space in the clay material. During the firing process, the burnout material converts to carbon and then disappears during off-gassing, which leaves a void the size of the original particle. There is a limit to the amount of porosity produced which is dictated by the proximity of clay particles to one another for integrity.

Reticulated foam materials typically involve taking an open-cell polymer-based reticulated foam and impregnating it with a clay slurry. The foam is wrung-out leaving only a coating of ceramic slurry within the foam. Upon firing, the polymer foam burns away leaving the ceramic exo-skeleton. The exo-skeleton is dense, but the bulk porosity is dictated by the reticulated-foam. There are limits on how small the pore size can be and foam ceramics are typically simple shapes such as plaques.

Vacuum casting involves mixing a watered down clay slurry with fibres and using a vacuum to remove the liquid content. This leaves the slurry and fibres in a felt-like mass that needs to be dried before firing. Firing locks in the structure and produces a lighter weight ceramic block. Shapes typically include large blocks or complex geometries.

Expanding clay materials are produced by firing certain types of naturally occurring clay in a rotating kiln. This process uses the natural organics in the mined clay as an expanding agent to expand to form porosity. The result is a spherical particle with porous core and dense shell. Spherical particles are the only shape that can be produced and the composition and therefore properties, of the fired article are governed by the composition of the mined clay.

Lightweight concrete uses aeration processes or aggregates like porous slag to lower the concrete density. Aeration involves pumping air into the concrete which traps the air as pores that retain their shape during curing thus making a lighter weight product. Porous slag is a bi-product of the steel making industry. Porous, smaller particles are separated from the slag and these are blended into the concrete mix. Slag particles are somewhat less dense than concrete, 25% weight reduction being common for the lightweight concrete industry.

Improvements are possible in processes for manufacturing lightweight ceramic materials and in articles of manufacture made using such materials.

SUMMARY OF THE INVENTION

According to one aspect of the invention, there is provided a process for manufacturing foamed material comprising blending an expansion agent and a ceramic base material and water to produce a blend, heating and pressurizing the blend to homogenize and liquefy it, extruding the blend through a die where, in the course of the extrusion, superheated water in the blend vaporizes to foam the blend, and cooling the extrudate. In this specification, the term liquefy will be understood to encompass plasticizing as well as liquefying.

Preferably the extrudate is fired substantially to drive off remaining water and organic content in the extrudate and to sinter or reaction cure the ceramic material. The expansion agent preferably comprises plant material, such as corn, wheat, rice, potato, apple, and/or carrot with a preferred expansion agent being chopped corn, preferably of the order of eighth inch (0.3175 centimeters) particle size or less.

The extruded, foamed material can be cut to a length before or after firing for preparation for use in producing an article of manufacture. Such a length of material can be machined to desired shape provided it is fired or dry enough that it has a measure of rigidity. Alternatively, the extrudate is subject to injection moulded while still malleable and formable, and before firing.

The expansion agent is preferably present in a weight proportion of between 25% and 50% of the blend weight. Water is present in a weight proportion of between 5% and 10% of the blend weight. Base materials may include any non-polymeric material which is at least one of mineral, grain, clay, ceramic, cement, concrete, and metal.

According to another aspect of the invention, there is provided a component produced by any of the processes as previously described. The component can be integrated with base materials that have not been foamed so as to produce a composite article having a lighter weight than if the article were formed solely from the base material.

BRIEF DESCRIPTION OF THE DRAWING

For simplicity and clarity of illustration, elements illustrated in the accompanying FIGURE are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying FIGURE, which forms a part of the specification, the FIGURE being a part schematic, part sectional view showing apparatus for use in a process according to one embodiment of the invention.

DETAILED DESCRIPTION OF THE INVENTION INCLUDING THE PRESENTLY PREFERRED EMBODIMENTS

There is described a cost effective direct expanded foam process for producing foam materials with customizable properties, varying shapes and sizes using any base or raw material that can be sintered or reaction cured, especially ceramic materials.

As shown in the accompanying FIGURE, an expansion agent 12 is blended with the base raw material(s) 14 and water 16 in a hopper 10. The blend is passed through a compression style extruder 18 which heats 20 and pressurizes the material blend as it is conveyed. After passing through a shaping die 22 at the exit of the extruder, the moisture vaporizes in an explosive manner carrying with it the base material. The moisture converts to steam (water vapour) which has an expanded volume that is many times the liquid water in the compressed blend. Moisture is retained by the expansion agent throughout the extrusion process and only allowed to escape during expansion. The expansion agent goes from a solid during mixing, to liquid in the extruder, and then to solid again upon expansion. Solidification of the expansion agent allows it to retain the shape of the pores created as the steam vaporizes. The base material(s) do not inherently expand, but are carried within the expansion agent like a suspension. This finely disperses the base materials throughout the mix from start to finish. The result is a rigid foam within seconds of expanding that retains its shape through cooling and subsequent finish drying/curing.

Actual constituents such as the nature of the expansion agent(s) and base material(s), the constituent amounts of the expansion agent(s) and base material(s) and water in the blend, and the applied temperature, pressure and other extrusion process properties are selected to produce a customizable end product. The end product material can itself be post-processed such as by injection moulding while the extrudate is still malleable or by machining once the extrudate has cooled and dried and, if desired, fired. Customizable properties can be achieved through the ratio of blending between expansion agent, base raw material(s) and water. More expansion agent typically produces more porosity in the final product. More base material typically produces a denser, less porous final product. Water is necessary for expanded foam production, with less water making a denser foam.

Shaping is dependent on the operation of the foaming process. Foam is produced continuously or intermittently. The foam can be readily machined in the expanded state or after post-processing. The foaming process makes materials easy to machine where machining would normally be extremely difficult if the materials were in their normal state. Continuous operation produces consistent cross sections of unlimited lengths. Insertion of a cutting mechanism at the exit of the die allows the foamed extrudate to be readily cut into intermediate lengths from particle size on through long lengths.

Of particular interest, pellet sized pieces of the extrudate are aggregated and fired to form bricks. Also of interest are radiant heating tiles for which pieces that are up from a few inches to a foot long and a few inches wide are made. These are subjected to a finish machining process to true up dimensions. Such tiles are used in combustion applications where a good seal is important for avoiding gas leaks. Also of interest, continuous tube or profiled shapes are cut to lengths on the order a several feet.

Intermittent operation allows the foam to be used in batch operations such as injection molding. Injection molding is typically used with complex geometries, large or small. The foaming process is started, injected, and stopped all within a single cycle lasting several seconds. The quick solidifying nature of the direct foaming process allows for parts to be ejected quickly producing fast cycle times. The injection moulding dies are subjected to rapid heating and cooling. Heating is important for keeping the expanded extrudate material flowing. Then, rapidly cooling the die quenches the material and ultimately the shape before the mould is opened and part ejected. The difference between injection moulding and continuous extrusion is that injection moulding is a batch process that requires a shot (i.e. metered dosage) of material with a defined start and stop to the process cycle. The cycle repeats very frequently, but is not continuous. Another difference is that the extrudate material expands into the die and solidifies in comparison with convention injection moulding where the material to be cast flows into the die as a liquid and then solidifies. The extrudate material flowed through the die in an expanded form without densifying the material as might otherwise happen owning to pores collapsing in response to high pressure build-up at the end of the injection cycle.

Various base raw materials can be directly foamed, essentially to produce a porous foam version of the starter material. Base materials may include non-polymeric materials such as minerals, grains, clays, ceramics, shales, cements, concrete, metals, etc. The process is not limited to these materials and may also include plastics and other traditionally foamed materials.

Various expansion agents can be used including corn, wheat, rice, potato, apple, carrot, etc., and where appropriate, mixtures of expansion agents.

The expansion process uses moisture in combination with the starch and, in some cases, gluten base of the expansion agent to produce an expanded product that retains its shape. The starch and gluten content become molten under the extreme pressure and temperature to homogenize the blended mixture. Thus, the expanded extrudate has very uniform properties and distribution of the expansion agent and the base material. Corn is a very robust expansion additive, providing good properties across a variety of material blends and at a low cost relative to existing foaming processes. Corn flour, cornmeal, corn grit, milled corn, chopped corn, cracked corn and whole corn can all be used. The food industry uses cornmeal as the staple material for expansion. Because of the "food grade" designation and extensive processing, cornmeal is not the most cost effective for industrial manufacturing of non-food expanded products. "Yellow" cornmeal has the skin and germ removed as a part of the processing. It results in the highest expansion ratio across the corn materials of 20:1 (ratio of expanded size to initial die size). Chopped corn is the most cost effective expansion material, providing the best combination of expansion properties versus cost with an expansion ratio of 10:1. Chopped corn takes the whole kernel and chops/cuts it into small particles ranging from flour to ⅛ inch (0.3175 centimeters) in size. At current pricing, chopped corn represents a 3+ fold cost saving over cornmeal at about half of the expansion for a net positive benefit for industrial purposes.

For expanded ceramic purposes, the proportion of expansion agent in the blend typically varies from 95% down to 5%, with the most stable fired ceramic foam product being between 50% and 25% expansion agent. At 100% proportion of expansion agent, there is no ceramic in the blend, so no material survives the firing process, as the organic agent turns to ash and disappears as a gas. At 0% expansion agent, there is no expansion and the ceramic base material either clogs the extruder, extrude with no expansion, or tears to pieces as the steam vaporizes because there is no starch or gluten to solidify and hold the mass together. The result of 100% clay-ceramic extrusion depends completely on the rheology of the base mix. Gritty mixes clog, dough-like mixes extrude, and non-plastic mixes steam to pieces. The 50% to 25% corn range is thought to have much to do with the volume of expansion agent added versus the clay-ceramic base. Expansion agent density ranges from about 2 to 4 times lighter than the base clay-ceramic material, which correlates well with the mixed volumes being similar.

If there is too much corn, in excess of 50%, then the shrinkage rate on subsequent firing rises exponentially and survivability rate drops. The reason is that the clay-ceramic particles are spread so far apart upon expansion that it takes that much shrinkage before clay-ceramic particles come in contact with one another and start to bond/sinter and resist additional high rate shrinkage. Fired/sintered shrinkage rates for 50+% corn by weight in the blend can be of the order of 25% to 90% which for most applications, negate the benefit of adding more corn because the fired product shrinks to close to its starting size. The result is a lightweight ceramic foam material but with very little net expansion after firing. Survivability of the high shrink materials is also a problem. Clay-ceramic particles need to be in contact with each other for the body to survive. This bonding/sintering of particles is what gives ceramic materials their strength. With insufficient sintering, the body is a mechanically locked group of particles that may look solid but is in fact extremely fragile if handled. Industrial applications generally require more robust materials for handling, mixing, etc. in high throughput environments.

Moisture is also important to direct expansion to produce the foamed ceramic material because, in the form of steam, it is what produces voids or pores in the expanded product. Most if not all the raw materials, both expansion agent and raw material base, have some amount of as-shipped moisture. Typically, the expansion agents have around 10% retained moisture for storage purposes—shelf life. A greater amount of moisture increases the risk of mold or decay. However, too little moisture means there is a risk of dust and the added cost to fully dry the raw product which can have up to 90% moisture when harvested. In the case of ceramics, the moisture content can vary from less than 0.5% on up to 10% for premixed materials. Typically, the best expanded results are for blends of expansion agent and base material having moisture content between 10% and 15%. The difference between the raw material moistures and blended target moistures is added as water during the mixing cycle. Too little moisture can result in clogging of the extrudate due to poor flow or a dry extrudate that has less expansion than desired, as the dryness restricts the expanded material mobility thus quenching in some intermediate structure. Too much moisture produces so much steam that the extrudate blows itself apart. The steam expands close to 2000 times its liquid volume and requires that the expansion agent form a bubble around this expanded void. When expansion is too high relating to too much steam, the bubble will burst and the expanded extrudate will lose its integrity, literally blowing to pieces. Too much water, for example 25+%, results is a damp, un-expanded extrudate and so much mobility in the mixed blend that it readily flows through the extruder and falls out of the die, not developing the residence time required for heat and pressure generation which are key to the foaming process.

Heat and pressure are important to direct foaming composite materials (2-phase system—expansion agent and base material). At start-up, the extruder and expansion die are externally heated to accelerate the foaming action. The pressure takes a couple of minutes to build to steady-state, as the extruder screw is normally clean at start-up. Moisture is added to the first material entering the extruder to make it easier to flow. This purge stage lasts only until the extruder is full and material starts to exit the die. The initial extrudate is wet and does not expand. This slowly transitions to wet material with expanded bubbles. The final stage is when the material stops transitioning and is fully expanded. This is called steady-state. Steady-state is reached when the feed, expansion and heating rates have all stabilized. In steady-state, the friction from within the extruder produces almost enough heat to maintain the temperature set points of 250° F. for the extruder barrel and 315° F. for the expansion die. These temperatures may vary based on the properties of the mix, where higher friction materials may produce slightly higher temperature set points and lower friction materials may require the supplementary heating controls to assist in maintaining the set points.

The screw is made up of 3 sections: feed, transition and metering. The feed section has the same dimensions throughout and is used to feed the loose mixed material from a hopper into the extruder. The transition section is where the compression, or pressurizing, takes place as the screw volume reduces from one unit to less than one unit as a result of compression. This compression forces the particles in the blend against one another creating friction that generates heat. Here, the blend converts from a loose, solid to a dense, molten flow. The pressure and heat is enough to activate the starch/gluten in the expansion agent producing a liquid phase that homogenizes and carries the base material. The metering section is right before the die and regulates the flow of material exiting the screw and entering the die. As a whole, the extruder takes one volumetric unit entering the feed section of the extruder, pressurizes it to produce less than one volumetric unit of feed in the compression/transition section of the extruder, this compressed feed being metered and pushed through the heated die until it reaches the die exit where it expands to produce from 1+ to 20 volumetric units of expanded/foamed output.

What is claimed is:

1. A process for manufacturing foamed material comprising blending particulate plant material, a particulate ceramic base material and water to produce a blend, with moisture content being less than 15% by weight of the weight of the blend, heating the blend in a screw compression extruder so as to subject particles in the blend to compression and friction forces sufficient to generate heat and to homogenize and convert the blend to a dense, molten flow including forming superheated water and plasticizing starch in the plant material, and extruding the blend through a die where, as a result of the extrusion, the superheated water vaporizes to foam the blend and to form pores bounded by the plasticized starch and associated particulate ceramic base material, and the extrudate cools to solidify the plasticized starch and associated particulate ceramic base material around the pores.

2. A process as claimed in claim 1, further comprising firing the extrudate to drive off remaining water and the solidified plasticized plant material in the extrudate and to sinter or reaction cure the ceramic base material.

3. A process as claimed in claim 2, wherein the fired extruded, foamed material is cut to a length for use in producing an article of manufacture.

4. A process as claimed in claim 3, wherein the length of material is machined.

5. A process as claimed in claim 2, wherein the extrudate is injection molded before firing.

6. A process as claimed in claim 1, wherein the particulate plant material is present in a weight proportion of between 25% and 50% of the blend weight.

7. A process as claimed in claim 1, wherein water is present in a weight proportion of between 5% and 10% of the blend weight.

8. A process as claimed in claim 1, wherein said particulate plant material is at least one of corn, wheat, rice, potato, apple and carrot.

9. A process as claimed in claim 8, wherein said particulate plant material is chopped corn.

10. A process as claimed in claim 9, wherein the corn is chopped to produce particles up to an eighth of an inch (0.3175 centimeters) across.

11. A process for manufacturing foamed material comprising blending particulate plant material, a particulate base material and water to produce a blend, with moisture content being less than 15% by weight of the weight of the blend, heating and applying pressure to the blend in a screw compression extruder so as to subject particles in the blend to compression and friction forces sufficient to generate heat and to homogenize and convert the blend to a dense, molten flow including forming superheated water and plasticizing starch in the plant material, and extruding the blend through a die where, as a result of the extrusion, the superheated water vaporizes to foam the blend and to form pores bounded by the plasticized starch and associated particulate base material, and the extrudate cools to solidify the plasticized starch and associated particulate base material around the pores, the particulate base material being at least one of mineral, clay, cement, concrete and metal.

* * * * *